United States Patent [19]

Flotow

[11] 4,023,661
[45] May 17, 1977

[54] COOLING SYSTEM FOR A VEHICLE CLUTCH

[75] Inventor: Richard A. Flotow, Fort Wayne, Ind.
[73] Assignee: Dana Corporation, Toledo, Ohio
[22] Filed: Nov. 10, 1975
[21] Appl. No.: 630,319
[52] U.S. Cl. .................. 192/113 B; 188/264 E
[51] Int. Cl.² ........................ F16D 13/72
[58] Field of Search ............ 415/6; 192/113 B, 57, 192/58 B, 58 C, 184, 70.12; 188/264 E, 264 P

[56] References Cited

UNITED STATES PATENTS

| | | | |
|---|---|---|---|
| 1,327,767 | 1/1920 | Lippincott | 192/113 B |
| 1,333,440 | 3/1920 | Ollard | 192/113 B |
| 1,859,280 | 5/1932 | Corbin | 192/113 B |
| 3,659,668 | 4/1972 | Ross et al. | 192/113 B |
| 3,741,343 | 6/1973 | Lindenfeld | 192/113 B |
| 3,897,860 | 8/1975 | Borck et al. | 192/113 B |
| 3,924,715 | 12/1975 | Cory | 192/113 B |

Primary Examiner—Benjamin W. Wyche
Attorney, Agent, or Firm—William J. Clemens

[57] ABSTRACT

A cooling system for a vehicle clutch including a cooling fluid distribution means and a heat exchange means. A bell housing encloses the clutch assembly and provides a sump for containing cooling fluid. A clutch pressure plate has a plurality of pickup tubes formed on its periphery which are passed through the cooling fluid as the pressure plate rotates with the engine flywheel. The cooling fluid is forced through the pickup tubes into the interior of the clutch assembly where the cooling fluid draws heat from the clutch elements and then drains back into the sump. The inlet openings of adjacent pickup tubes are offset with respect to one another to increase the flow of cooling fluid. The rotation of the flywheel and the pressure plate generates a flow of the cooling fluid in the pool. A sump pan is connected to the bell housing and includes a baffle for diverting the flow of cooling fluid into the sump pan which is formed with a corrugated bottom and finned sides to function as a heat exchange means.

7 Claims, 6 Drawing Figures

COOLING SYSTEM FOR A VEHICLE CLUTCH

BACKGROUND OF THE INVENTION

1. Field of the Invention

The present invention relates to a cooling system for a wet clutch in a motor vehicle.

2. Description of the Prior Art

In general, a friction clutch for a motor vehicle is enclosed in a bell-shaped housing which is secured to the engine block. The bell housing also encloses a flywheel which is attached to the output end of the engine crankshaft for rotation therewith. The flywheel has a friction face or driving surface which can be engaged by friction linings mounted on a clutch disk. The clutch disk is attached to an output shaft which may be connected to a set of gears in a transmission. A pressure plate is forced against the clutch disk by a plurality of clutch springs acting against a clutch cover attached to the flywheel. The clutch disk is forced into engagement with the driving surface of the flywheel such that the rotational movement of the engine is transmitted to the output shaft.

Typically, the bell housing contains a fluid, such as air or oil, in which the clutch operates. The rotation of the clutch disk, the pressure plate and the clutch cover tends to expel the fluid from the vicinity of these elements under the influence of centrifugal force. Heat generated during the slipping of the clutch elements which are not in full engagement is carred by the fluid towards the walls of the bell housing through apertures in the cover plate. Generally, heat dissipation by conduction through the walls of the bell housing is slow. If the clutch slips for any appreciable amount of time, the temperature of the clutch elements and the surrounding fluid will increase substantially which will tend to shorten the clutch life. Cooling fins formed on the exterior surface of the bell housing will increase the rate of heat dissipation, but do not provide a significant reduction in clutch operating temperatures under prolonged slip conditions.

One method of increasing heat dissipation is to pass the fluid through an external heat exchanger. In one form of a friction clutch where the cooling fluid is air, the bell housing is provided with two ports, one of which is located nearer to the radial periphery of the clutch than the other. The ports are connected to a heat exchange means external of the bell housing which may be a hollow casing mounted in the air stream created by movement of the vehicle. The casting may also have fins formed on its external surfaces for increased heat dissipation. Since the rotation of the clutch elements creates a zone of relatively high pressure in the vicinity of the nearer port, whereas the pressure in the bell housing in the vicinity of the other port remains at a lower value, a pressure differential is created to generate a flow of air through the heat exchange means such that the heated air is carried away from the clutch and is cooled in the heat exchange means before being returned to the bell housing. The nearer port may be inclined in the direction of rotation of the clutch so that the tangential components of the induced air flow in the vicinity of the clutch assist in creating the flow through the heat exchange means. Furthermore, the other port may be inclined opposite to the direction of rotation of the clutch so that the tangential components of the induced air flow in the vicinity of the clutch assist in the return of the air to the bell housing. Such a heat exchange means is disclosed in U.S. Pat. No. 3,661,238, issued May 9, 1972 to David A. Davies.

Where the fluid is oil, another method of increasing heat dissipation is to provide scoops attached to the clutch elements to dip into the oil stored in the sump of the bell housing. These scoops may be in the form of tubes having an inlet inclined in the direction of rotation of the clutch and an outlet in the vicinity of the engagement surface of the clutch disk. Alternatively, the scoops may be formed as integral hook-shaped diverters on the periphery of the clutch disk. Each diverter has a finger portion tapered in a direction opposite the direction of rotation of the clutch elements and has a curved ramp on its inner edge which functions to divert the oil radially inwardly of the disk into a diagonal slot from which the oil feeds into grooves in friction facings on the disk. The oil is retained between the flywheel and the clutch cover and tends to rotate therewith. Until full engagement is achieved, the clutch disk will rotate slower than the flywheel and clutch cover with an opposite relative direction of rotation to render the diverts effective. However, the difference in speeds and, therefore, the quality of cooling oil diverted is the least at low slip conditions where the highest amount of heat is generated. Therefore, this type of cooling system is least effective under prolonged low slip conditions when increased cooling is required. A wet clutch having hook-shaped diverters is disclosed in U.S. Pat. No. 3,897,860, issued Aug. 5, 1975 to Howard O. Borck, et al.

SUMMARY OF THE INVENTION

The present invention concerns a cooling system for a clutch assembly enclosed in a bell housing. The bell housing forms a sump for a cooling fluid which is preferably oil and is so referred to hereinafter although it will be understood that any gas or liquid having suitable heat transfer properties can also be utilized. The cooling system includes an oil distribution means and a heat exchange means for dissipating the heat generated by slippage between the clutch elements.

A clutch pressure plate is fastened to an engine flywheel for rotation therewith. The pressure plate defines the oil distribution means as a plurality of oil pickup tubes formed on the periphery of the pressure plate and in fluid communication with the interior of the clutch assembly. As the pressure plate rotates with the flywheel, the pickup tubes pass through a pool of oil in the sump and oil is forced through the tubes into the interior of the clutch assembly. The oils draws heat from the clutch elements and drains from the clutch assembly back into the sump. The inlet openings of adjacent ones of the pickup tubes are offset from one another to define different paths of travel through the pool of oil thereby increasing the amount of oil distributed to the clutch elements and the efficiency of the cooling system.

A sump pan is fastened to the bell housing and includes an inclined baffle which extends into the pool of oil in the sump. As the flywheel and the pressure plate rotate, there is generated a flow of oil in the pool which is diverted into the sump pan by the baffle. The sump pan is formed with a corrugated bottom and finned sides for increased heat dissipation and functions as a heat exchange means to cool the oil. The pooled oil is forced out of the sump pan and back into the sump by the heated oil which is diverted by the baffle. The pickup tubes and the sump pan function together as a cooling system to prolong clutch life under clutch slippage conditions.

It is an object of the present invention to provide a more efficient cooling system for a vehicle clutch.

It is another object of the present invention to provide a vehicle clutch cooling system which increases the amount of cooling fluid provided to the interior of the clutch assembly per unit of time.

It is a further object of the present invention to provide a vehicle clutch cooling system which utilizes the natural flow of cooling fluid in a bell housing sump to provide a flow through a heat exchange means for dissipating heat generated by the slipping of the clutch.

DESCRIPTION OF THE PREFERRED EMBODIMENT

Figure 1:
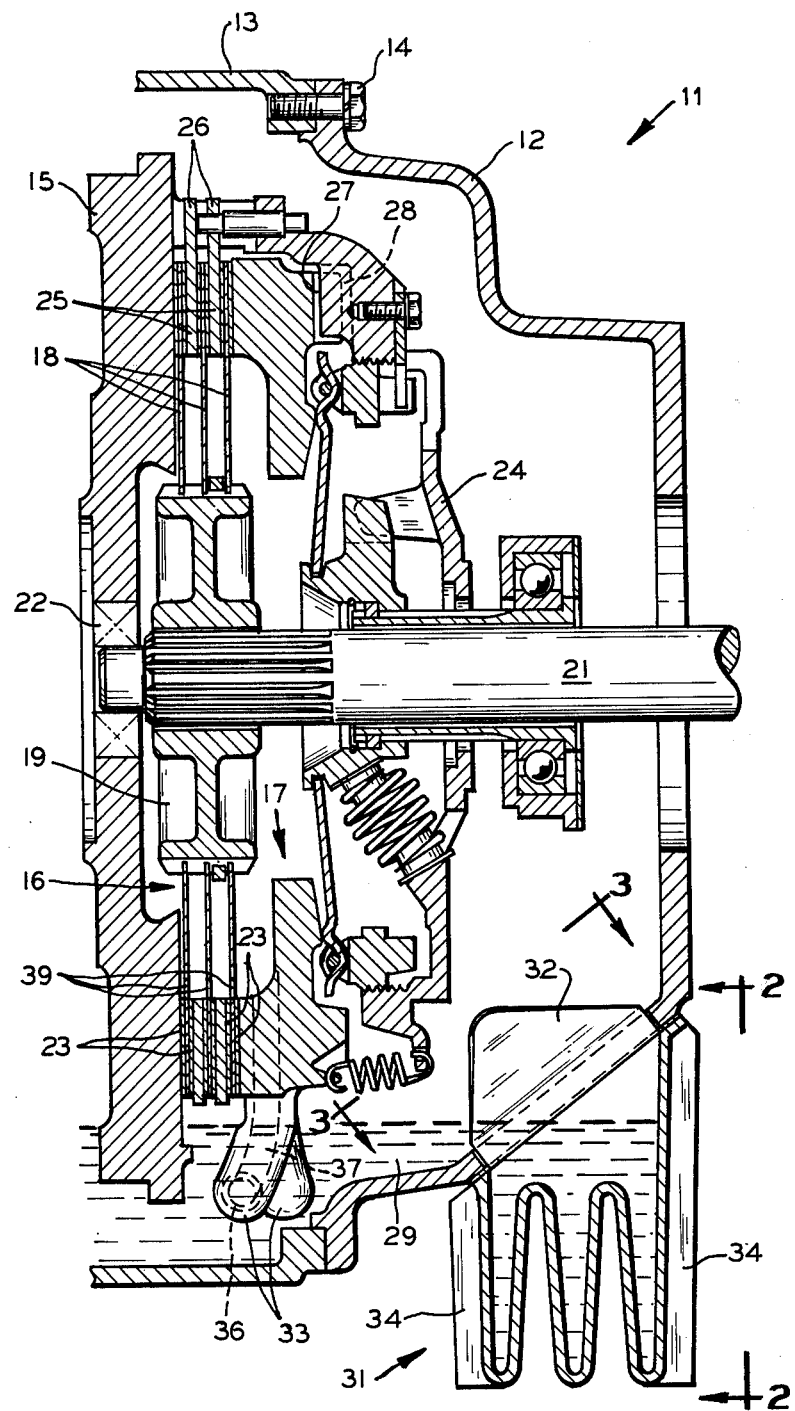
FIG. 1 is a diametrical sectional view of a clutch assembly including the present invention shown engaged with a flywheel.

FIG. 1 is a diametrical sectional view of a clutch assembly 11 enclosed within a bell housing 12 fastened to a rear extension 13 of an engine block (not shown) by any suitable means such as a plurality of bolts 14 spaced about the periphery of the bell housing. A flywheel 15 is secured to and rotates with an engine crankshaft (not shown). The rearwardly facing planar surface of the flywheel 15 is adapted to be engaged by a friction lining or facing on a clutch disk.

The clutch assembly 11 includes a driven clutch disk assembly 16 and a pressure plate 17. The disk assembly 16 comprises three annular clutch disks 18 secured to a central hub 19 which in turn is slidably splined on an output shaft 21. Typically, the rearward end of the output shaft 21 is connected to the gears in a transmission and the forward end is piloted in a bearing 22 retained in the flywheel 15 coaxial with the engine crankshaft. A friction facing 23 is provided on both faces of each of the clutch disks 18.

A clutch cover 24 is rotatably retained on the output shaft 21 and is fastened to the flywheel for rotation therewith. A pair of driven plates 25 are spaced intermediate the clutch disks 18 and have formed thereon a plurality of circumferentially spaced lugs 26 which engage slots formed in the periphery of the clutch cover 24. The pressure plate 17 has formed thereon a plurality of axially rearwardly extending driving lugs 27 which cooperate with a plurality of slots 28 extending axially rearwardly into the clutch cover 24. Therefore, as the flywheel 15 is rotated by the engine, the flywheel, the pressure plate 17, the clutch cover 24 and the driven plates 25 rotate together.

Suitable means is provided to move the pressure plate 17 axially toward the flywheel 15 to compress the driven clutch disk assembly 16 against the flywheel. As the pressure plate 17 is moved, the friction facings 23 will initially engage the friction surfaces on the flywheel 15, the pressure plate 17 and the driven plates 25 such that the clutch disks 18 and the output shaft 21 tend to be driven into rotation. As the pressure plate 17 is moved from the initial engagement position to full engagement, the speed of rotation of the clutch disks 18 increases to approach the speed of rotation of the rest of the clutch assembly 11 and the flywheel 15 thereby decreasing the speed difference or slip between the friction facings 23 and the opposing friction surfaces. However, the pressure on the clutch disk assembly 16 increases so that the maximum heating effect due to slip between the friction facings 23 and the opposing surfaces occurs at the lowest value slip. This heat must be dissipated or the life of the clutch will be drastically reduced.

The present invention provides a clutch cooling system which includes a cooling fluid distribution means integral with the clutch pressure plate 17 and a heat exchange means external of the bell housing 12. A lower portion of the bell housing 12 functions as a reservoir or sump for a suitable cooling fluid 29 such as oil. A sump pan 31 is fastened to the bell housing 12 and has a baffle 32 formed thereon which extends through an opening in the bell housing into the pool of oil 29. The pressure plate 17 has a plurality of oil pickup tubes 33 formed on its periphery. A pair of the pickup tubes 33 are shown drawn out of position relative to one another in FIG. 1 for purposes of illustration. As the pressure plate 17 rotates with the flywheel 15, the movement of the flywheel and the pickup tubes 33 through the oil 29 generated increased fluid pressure in the oil such that the pool of oil tends to flow in the same direction as the direction of rotation.

Figure 3:
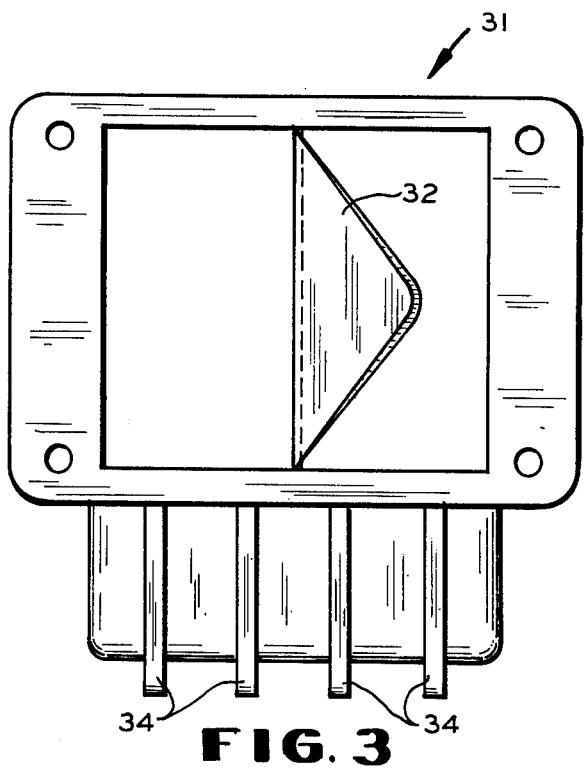
FIG. 3 is an inclined view of the sump pan and baffle viewed in the same direction as shown by the lines 3—3 of FIG. 1.
Figure 2:
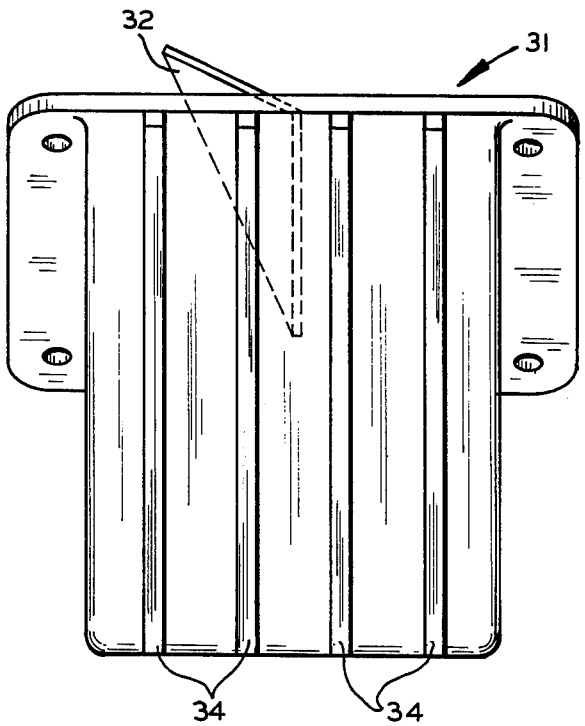
FIG. 2 is a side elevational view of the sump pan viewed in the same direction as shown by lines 2—2 of FIG. 1.

FIG. 2 is a side elevational view of the sump pan 31 viewed in the same direction as shown by the lines 2—2 of FIG. 1 and FIG. 3 is an inclined view of the sump pan and the baffle 32 viewed in the same direction as shown by the lines 3—3 of FIG. 1. Referring to FIGS. 1 through 3, the sump pan 31 is formed with a corrugated bottom surface and a plurality of fins 34 on its forwardly and rearwardly facing external surfaces. The fins and the corrugated bottom provide a relatively large heat dissipating area and the sump pan 31 may be formed from a material having good heat conducting properties. The sump pan may also be positioned below the bell housing 12 to expose it to the air stream created by movement of the vehicle such that the sump pan functions as a heat exchange means to extract heat from the oil flowing through it.

The baffle 32 is inclined toward the direction of flow of the oil 29 and tends to deflect the moving oil down into the sump pan 31. The deflected oil displaces the cooled oil in the sump pan which is forced into the bell housing 12. Therefore, the moving flywheel 15 and pressure plate 17 generate a flow of heated oil 29 which is diverted by the baffle 32 into the sump pan 31 to be cooled and returned to the bell housing 12.

Figure 6:
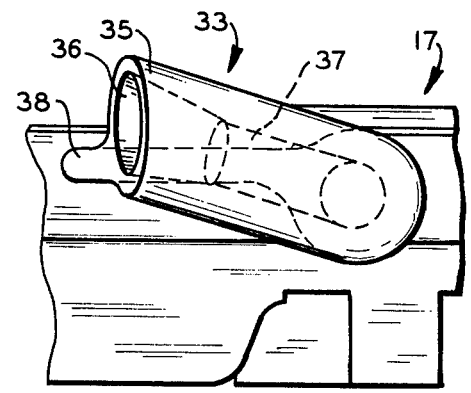
FIG. 6 is an inclined view of an oil pickup tube showing the offset of the inlet with respect to the outlet taken along the line 6—6 of FIG. 4.
Figure 5:
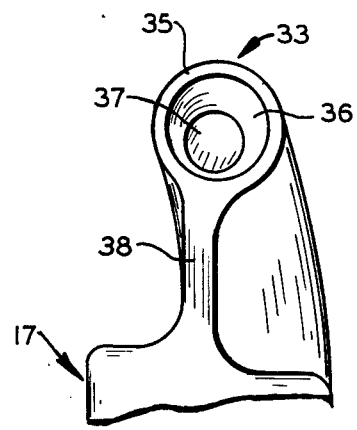
FIG. 5 is an inclined view of an oil pickup tube showing the oil inlet opening taken along the line 5—5 of FIG. 4.
Figure 4:
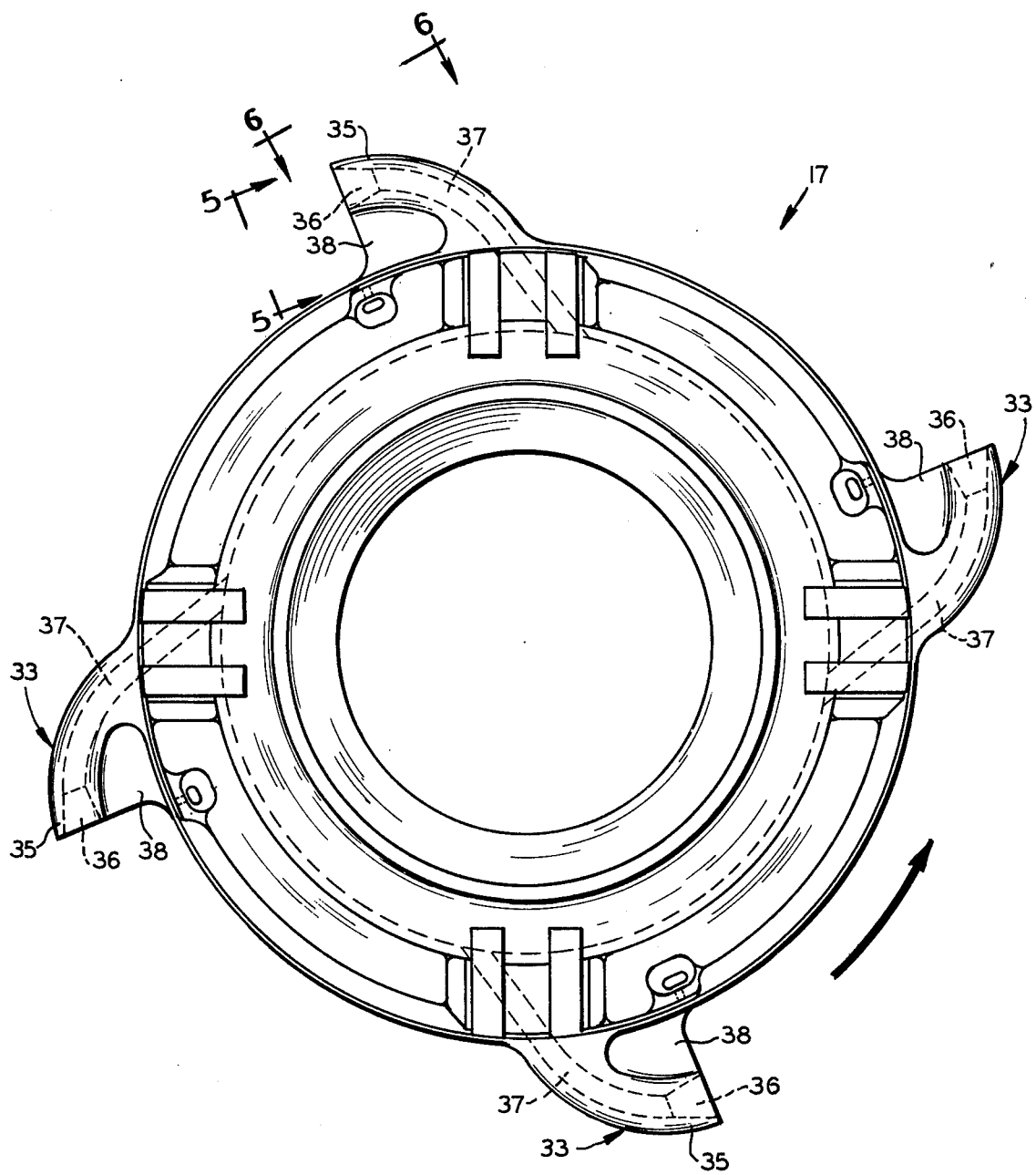
FIG. 4 is a side elevational view of the pressure plate of FIG. 1.

FIG. 4 is a side elevational view of the pressure plate 17 of FIG. 1. FIGS. 5 and 6 are inclined views of an oil pickup tube 33 taken along the lines 5—5 and 6—6 of FIG. 4. Referring to FIGS. 1, 4, 5, and 6, it may be seen that the pressure plate 17 has a plurality of oil pickup tubes 33 formed on the periphery thereof. Although four pickup tubes are shown in FIG. 4, the number utilized will depend upon the amount of oil flow desired. Furthermore, the pickup tubes are advantageously equally spaced about the periphery to avoid the undesirable and potentially destructive vibrations associated with an unbalanced spinning mass.

Each of the pickup tubes 33 has an inlet end 35 having an inlet opening 36 formed therein. The inlet openings 36 face in the direction of rotation of the pressure plate 17 which is counterclockwise as shown by the arrow in FIG. 4. The opening 36 tapers down in diameter from its leading edge to its trailing edge where it connects with an oil passageway 37 leading to the interior of the pressure plate 17 adjacent the clutch disks 18 as shown in FIG. 1. The pickup tube 33 is strengthened by a web 38 formed between the tube body and the periphery of the pressure plate 17. As each of the pickup tubes 33 is rotated into the pool of oil 29 in the sump area of the bell housing 12, a portion of the oil 29 is forced into the opening 36 and through the passageway 37. The rotational movement of the pressure plate 17 will tend to spray the oil emerging from the passageway 37 over the most rearward of the clutch disks 18. Each of the clutch disks 18 has a plurality of radially spaced apertures 39 formed thereon through which the oil 29 is forced such that the flywheel 15, the driven plates 25 and the clutch disks are all bathed in the cooling oil. The oil will draw the heat out of the clutch elements and will drain between the clutch elements and through apertures in the pressure plate 17 into the sump portion of the bell housing 12. The heated oil is diverted into the sump pan 31 by the baffle 32 where it is cooled and returned to the sump to be apertured by the pickup tubes 33 and again be utilized to cool the clutch elements.

It may be seen in FIGS. 1, 5 and 6 that the inlet ends 35 of the tubes 33 are offset from the path of travel generated as the pressure plate 17 rotates. Adjacent tubes are offset to opposite sides of the path of travel as shown by the pair of tubes drawn out of position in FIG. 1 to illustrate this feature of the present invention. As the tubes 33 are rotated through the pool of oil 29, a portion of the oil in the path of travel will be forced into the inlet opening 36 and the oil passageway 37 and the rest of the oil in the path of travel will be pushed aside. Thus, each of the rotating pickup tubes will tend to form a channel in the pool of oil which must be filled with oil from the pool before the next pickup tube is rotated past. If the inlet openings were not offset and the channel did not fill quickly enough, the next pickup tube would not be filled to capacity and the cooling efficiency of the system would be reduced. By offsetting the adjacent inlet openings, the channel has twice as much time to fill and more cooling oil is delivered to the interior of the clutch assembly 11.

In one embodiment of the present invention the inlet openings were offset sufficiently to provide that the path of travel of the inlet end of one of the pickup tubes was outside the path of travel of the inlet opening of the adjacent pickup tubes. In this configuration, the flow of cooling oil through the pickup tubes was four times as much as compared with the flow of oil for the same clutch rotating at the same speed where the inlet openings were aligned in a common path of travel.

In summary, the present invention concerns a cooling system for a vehicle clutch including a sump pan heat exchanger and a cooling fluid distribution means. The bell housing 12 covers the clutch assembly 11 and provides a sump for a pool of oil 29. A plurality of oil pickup tubes 33 are formed on the periphery of the pressure plate 17 and are rotated through the pool of oil to force oil into the interior of the clutch assembly. The oil absorbs heat from the clutch elements and is returned to the pool of oil in the sump. The inlet openings of adjacent pickup tubes are offset from one another to increase the flow of oil into the clutch interior thereby increasing the efficiency of the cooling system.

The sump pan 31 is connected to the bell housing and includes a baffle 32 which diverts oil which has been set in motion by the rotation of the flywheel 15 and the pressure plate 17. The diverted oil enters the sump pan where the heat is dissipated and the cooled oil is forced back into the pool of oil by the oil entering the sump pan. The sump pan has finned sides and a corrugated bottom to increase the heat dissipating area.

In accordance with the provisions of the patent statutes, the principle and mode of operation of the invention have been explained and illustrated in a preferred embodiment. However, it must be understood that within the spirit and scope of the appended claims, the invention may be practiced otherwise than as specifically illustrated and described.

What is claimed is:

1. A cooling system for a clutch assembly comprising a disc assembly, a pressure plate, a source of a cooling fluid and a cooling fluid distribution means for supplying said cooling fluid to the interior of the clutch assembly, said distribution means including at least a pair of pickup tubes formed on the periphery of said pressure plate, each of said pickup tubes defining an inlet opening connected in fluid communication with the interior of the clutch assembly by a fluid passageway and wherein said inlet opening of each of said pickup tubes is offset with respect to the path of travel and said inlet opening of the other one of said pickup tubes.

2. A cooling system according to claim 1 wherein said cooling fluid source is a bell housing enclosing the clutch assembly having a sump for containing a pool of said cooling fluid.

3. A cooling system according to claim 1 including heat exchange means for dissipating heat from said cooling fluid.

4. A cooling system according to claim 3 wherein said heat exchange means is a sump pan having a baffle extending into said cooling fluid source for diverting into said sump pan a flow of said cooling fluid generated by the rotation of said rotating clutch element.

5. A cooling system according to claim 4 wherein said baffle is inclined toward the flow of said cooling fluid.

6. A cooling system according to claim 4 wherein said sump pan is formed with a corrugated bottom.

7. A cooling system according to claim 4 wherein said sump pan is formed with external cooling fins.

* * * * *

UNITED STATES PATENT OFFICE
CERTIFICATE OF CORRECTION

Patent No. 4,023,661    Dated May 17, 1977

Inventor(s) Richard A. Flowtow

It is certified that error appears in the above-identified patent and that said Letters Patent are hereby corrected as shown below:

Column 1, line 50    Change "casting" to - - - casing - - -.
Column 2, line 22    Change "diverts" to - - - diverters - - -.
Column 2, line 24    Change "quality" to - - - quantity - - -.
Column 2, line 66    Change "pooled" to - - - cooled - - -.
Column 4, line 36    Change "generated" to - - - generates - - -.
Column 5, line 33    Change "apertured" to - - - captured - - -.
Claim 1, line 11     Change "and" to - - - of - - -.

Signed and Sealed this

Second Day of May 1978

[SEAL]

Attest:

RUTH C. MASON
Attesting Officer

LUTRELLE F. PARKER
Acting Commissioner of Patents and Trademarks